United States Patent
Wang (10) Patent No.: US 12,365,825 B2
(45) Date of Patent: Jul. 22, 2025

(54) METHODS AND SYSTEMS TO DETERMINE A CONCENTRATION OF SEALING PARTICULATES IN DRILLING FLUID

(71) Applicant: Sharp-Rock Technologies, Inc., Cypress, TX (US)

(72) Inventor: Hong Max Wang, Cypress, TX (US)

(73) Assignee: Sharp-Rock Technologies, Inc., Austin, TX (US)

(*) Notice: Subject to any disclaimer, the term of this patent is extended or adjusted under 35 U.S.C. 154(b) by 310 days.

(21) Appl. No.: 18/142,969

(22) Filed: May 3, 2023

(65) Prior Publication Data
US 2023/0272261 A1 Aug. 31, 2023

Related U.S. Application Data

(63) Continuation-in-part of application No. 16/373,742, filed on Apr. 3, 2019, now abandoned.

(60) Provisional application No. 62/665,568, filed on May 2, 2018.

(51) Int. Cl.
*G01M 3/26* (2006.01)
*C09K 8/42* (2006.01)

(52) U.S. Cl.
CPC .................. *C09K 8/426* (2013.01)

(58) Field of Classification Search
CPC .................. E21B 33/138; E21B 21/03; G01N 2015/0662; G01N 15/0618
See application file for complete search history.

(56) References Cited

U.S. PATENT DOCUMENTS

| | | | | |
|---|---|---|---|---|
| 9,109,992 | B2* | 8/2015 | Wang | C09K 8/40 |
| 2003/0181338 | A1* | 9/2003 | Sweatman | E21B 21/003 |
| | | | | 507/100 |
| 2006/0266107 | A1* | 11/2006 | Sweatman | E21B 21/08 |
| | | | | 73/152.01 |
| 2006/0266519 | A1* | 11/2006 | Sweatman | E21B 33/138 |
| | | | | 166/250.1 |
| 2006/0272860 | A1* | 12/2006 | Sweatman | E21B 33/138 |
| | | | | 166/250.1 |
| 2009/0221452 | A1* | 9/2009 | Whitfill | C09K 8/508 |
| | | | | 507/104 |
| 2010/0181073 | A1* | 7/2010 | Dupriest | C09K 8/03 |
| | | | | 166/308.1 |
| 2012/0108472 | A1* | 5/2012 | Wu | C09K 8/035 |
| | | | | 507/112 |
| 2013/0143777 | A1* | 6/2013 | Wang | C09K 8/03 |
| | | | | 977/773 |
| 2015/0292278 | A1* | 10/2015 | Wang | C09K 8/467 |
| | | | | 166/292 |
| 2015/0292279 | A1* | 10/2015 | Wang | E21B 21/003 |
| | | | | 166/293 |

* cited by examiner

*Primary Examiner* — Alexander A Mercado
(74) *Attorney, Agent, or Firm* — Pierson IP, PLLC (57) ABSTRACT

Determining a seal weight of a sealing composition for sealing a selected seal width and using the seal weight to compare different sealing compositions for sealing efficiency. The seal weight is also to be used to directly determine the minimum concentration of a sealing composition in drilling fluid for a desired level of spurt loss control in order to prevent losing drilling fluid into a hydraulic fracture.

2 Claims, 6 Drawing Sheets

METHODS AND SYSTEMS TO DETERMINE A CONCENTRATION OF SEALING PARTICULATES IN DRILLING FLUID

BACKGROUND INFORMATION

Field of the Disclosure

Examples of the present disclosure relate to systems and methods for quantitively defining sealing capacities of various particulate sealing compositions for drilling fluids to prevent losing the drilling fluid into a hydraulic fracture. Embodiments disclose that, for quantitively defining the sealing capacity of a sealing composition, one needs only two parameters: seal weight and seal width. More specifically, embodiments relate to utilizing a seal weight to quantify the sealing to a specific fracture width or seal width of sealing compositions and utilizing this seal weight as a basis to compare different sealing compositions for sealing the same seal width. Furthermore, the seal weight is used to find a minimum concentration of the sealing composition to control a desired level of spurt loss for a drilling fluid incorporating the sealing composition. A wellbore then can be drilled with a concentration of the sealing composition equal to or greater than the minimum concentration.

Background

When drilling a wellbore for hydrocarbons, drilling fluid of a certain density is typically pumped downhole to help cut rock, clean cuttings, lubricate a drill bit, cool the drill bit, etc. While being pumped downhole, the drilling fluid may apply hydraulic pressure against the wellbore wall, which can rupture a weak zone of the wellbore and induce a hydraulic fracture. This drilling fluid, though it typically contains very fine clay particles, may continue to flow into the hydraulic fracture and get lost. Conventionally to reduce losses for drilling fluid, before the weak zone is drilled, sealing particles, typically much larger than the clay particles in drilling fluid, are mixed into the drilling fluid to turn the drilling fluid into a sealing fluid. In this way, when the wellbore is ruptured and drilling fluid starts to flow into the fracture, the drilling fluid in the sealing fluid then may carry the sealing particles to the fracture along with the flow. A specific formulation of various sealing particles may be called a sealing composition. Different sealing compositions may have different sealing efficiencies or capacities. At the early stage of the hydraulic fracture, hopefully the fracture width is typically small and majority of the sealing particles may not be able to get into the fracture with the flow. When enough of the sealing particles that cannot enter the fracture accumulate at the entrance of the fracture, the hydraulic fracture may be then sealed and no further drilling fluid may be lost into the fracture. When the fracture is just sealed, the drilling fluid that flowed into the fracture is a spurt loss.

Any sealing composition of sealing particles can only efficiently seal up to a certain fracture width or the seal width, which may be close to the maximum size of the particles in the sealing composition. However, if the drilling fluid does not include a sufficient concentration of the sealing particles, a seal at the hydraulic fracture cannot be formed when the growing fracture width opens to the seal width. This leads to further widening of the hydraulic fracture beyond the seal width. So conventionally, it is preferred to control the spurt loss of a sealing fluid to be very small, and this may require a very high concentration of sealing particles. However, utilizing a too high concentration of the sealing particles may limit the effectiveness of the drilling fluid and is not cost effective either. Therefore, it is desirable to know the relative effectiveness of different sealing compositions in a simplified way, and how much of a sealing composition should be selected in various situations.

Conventionally, one can test a sealing composition for its spurt loss against a slot disk at a specific concentration. A spurt loss test can simulate the flow of fluid into a fracture and the formation of a seal at the entrance of the fracture. However, in order to compare different sealing compositions, one must test them at the same concentration and against the same slot disk for confidence. Often different sealing compositions to be compared may not have been tested at the same concentration and then comparison requires new tests to be done for those not tested at the same concentration. This is not convenient. Furthermore, even for the same sealing composition, one may need to test the sealing composition at several concentrations in order to better know the sealing composition's sealing capacity for various applications.

Accordingly, needs exist for systems and methods to, with meaningful parameters, efficiently and effectively quantify a sealing composition of sealing particles for its sealing capacity and, by the parameters, further determine the minimum concentration required in a drilling fluid to prevent losing drilling fluid when drilling a specific weak wellbore when the desired control level is known.

SUMMARY

Examples of the present disclosure relate to systems and methods quantitively defining the sealing capacity of a sealing composition of sealing particulates mixed within a drilling fluid to prevent losing drilling fluid while sealing a hydraulic fracture. Embodiments described herein utilize determining a unit weight of a particulate sealing composition required to seal a unit length section of the entrance of a hydraulic fracture at a wellbore wall. The determination of the unit weight may be based on a concentration of the sealing particulates within the drilling fluid and the spurt loss from a slot disk test with a slot simulating the entrance of a unit section of the hydraulic fracture. This unit weight is called seal weight. The seal weight may be classified as the total weight of sealing particulates from a sealing composition required just for forming the seal to a slot or a fracture entrance of a unit length. When such a seal is recently formed, the whole drilling fluid, typically including a liquid and some very fine clay particles, suspending the sealing composition may not be able to pass through the slot anymore, though some liquid may still slowly seep through the recently formed seal. The seal weight may be obtained by collecting and weighing all the particulates of a seal to all slots at the end of a spurt loss period from a slot disk test. A person having ordinary skill in the art knows how to do a slot disk test and how to determine the end of a spurt loss period of the slot disk test. It is newly discovered that the seal weight is a constant for a specific sealing composition regardless the concentration of the sealing composition is tested at. Furthermore, when the seal weight is constant, it is understandable that the less the seal weight, the more efficient the sealing.

In embodiments, sealing particulates may be mixed with drilling fluid at a first concentration to form a sealing fluid. Next, a spurt loss test may be performed by allowing the sealing fluid with the sealing particulates to flow through a slot within a disk. Different slot disks may have different total slot lengths. In order to compare with different sealing compositions, the seal weight is only the weight of particulates from a formed seal on only a unit length of the slot. One exemplary unit length is one foot. A seal weight may have a unit as grams per foot and the seal weight is the total weight of sealing particles from a sealing composition required to seal off a slot of a specific width and of 1 foot long. For example, one seal weight may be 1.5 grams per foot. Another seal weight may be 2.45 grams per foot.

In theory, each sealing formulation may have a maximum slot width it can seal. However, in reality, it is difficult and also unnecessary to determine exactly this maximum slot width. It is just preferred to select a seal width close to this maximum slot width. More realistically, a seal width selected is just a slot width of a slot disk used to obtain a seal weight in a spurt loss test against the slot disk. For example, a seal width may be 200 microns, 500 microns or 850 microns. A sealing composition may have multiple seal widths and seal weights. To this end, a seal weight is always paired with a specific seal width. $W_s$ as a seal width value may fall between zero and the largest particle size of a sealing composition.

In embodiments, where there are multiple sealing compositions it is possible to compare their relative sealing performance or capacity based on the seal weight of each sealing composition if all the seal weights are obtained on the same slot width. For example, if a first and second sealing composition of sealing particulates has the same seal width but the first sealing composition has a smaller seal weight, then the first sealing composition may be more efficient than the second sealing composition. As such, the first sealing composition may be used with drilling fluid in a lower concentration than the second sealing concentration for the same weak wellbore.

In further embodiments, if a first sealing composition has a seal weight that is only half of the seal weight of a second sealing composition, the comparison of seal weights may indicate that the first sealing composition is twice as effective as the second sealing composition. In other words, if drilling a weak wellbore requires one concentration of the first sealing composition, drilling the same weak wellbore may require twice the concentration of the second sealing composition.

Conventionally, sealing particulates are added to control the spurt loss to a required level. Easy to know what concentration is required to a desired level of spurt loss control would be efficient and convenient.

Sealing particulates may be configured to have various sealing performances. Since sealing compositions may be comprised of various sealing particulates of different densities and sealing efficiencies, sealing fluids comprised of different sealing compositions may generate different seal weights. However, for the same sealing composition, sealing a given slot would require only a certain weight of the sealing particulates. Therefore, when utilizing the same sealing composition, the weight of the sealing particulates required to form the seal to a unit length of the slot is constant. This weight is the seal weight.

In further embodiments, it may be required to determine the seal weight of a sealing composition of sealing particulates. For example, with a slot disk with a slot having a one foot length and 500 micron width and a sealing composition capable of sealing the seal width of 500 microns based on the size of the sealing particulates, if a concentration of the sealing composition as 35 grams in 350 milliliters of in drill fluid produces a spurt loss of 50 millimeters with the slot disk test, the seal weight is 35/350*50=5.0 grams per foot of the slot length. For a different sealing composition, if a disk of multiple slots has a total slot length of 2 feet and each slot is 500 microns wide and the same spurt loss of 50 millimeters is produced at the same concentration, in another embodiment, then the seal weight for this sealing composition may be determined by multiplying the concentration of sealing particles by the spurt loss, and dividing that number by the total length of the slots. This may result in the seal weight for the sealing composition to be 35/350*50/2=2.5 grams per foot. Apparently, the latter sealing composition with a half of the seal weight of the former is twice efficient as the former. A slot disk may have multiple slots of the same width W to have a total slot length L large enough in order to acquire enough accuracy of the spurt loss test.

In embodiments, the minimum concentration of the sealing composition may be based on the seal weight of the sealing composition, and a desired level of spurt loss control for drilling a weak wellbore. To calculate the minimum concentration, the desired spurt loss must be converted to be a spurt loss volume over the same unit length of slot at the same seal width. The minimum concentration of the sealing composition in the drilling fluid may be determined by dividing the seal weight for the sealing composition by the desired spurt loss volume per unit length of the seal width for the weak wellbore. So, for calculating a minimum concentration of a sealing composition, any desired spurt loss must have the same unit slot length as the seal weight of the sealing composition. In other words, a desired spurt loss is a spurt loss over a unit slot length and the unit is the same as for the seal weight for the selected sealing composition to control the desired spurt loss. Typically, the unit is one foot.

In a first example, for a seal width as 200 microns, if it is determined that the desired unit spurt loss volume is 10 milliliter per foot and a selected sealing composition has a seal weight being 1.25 grams per foot, for the same seal width of 200 microns, then it may be determined that the minimum concentration of the sealing composition in drilling fluid is 1.25/10*350=43.75 grams in 350 milliliters of the drilling fluid.

However, in a second example with a desired unit spurt loss volume of 20 milliliter per foot, it may have a minimum concentration of the same sealing composition in the drilling fluid as 1.25/20*350=21.875 grams in 350 milliliters of the drilling fluid.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

Figure 1:
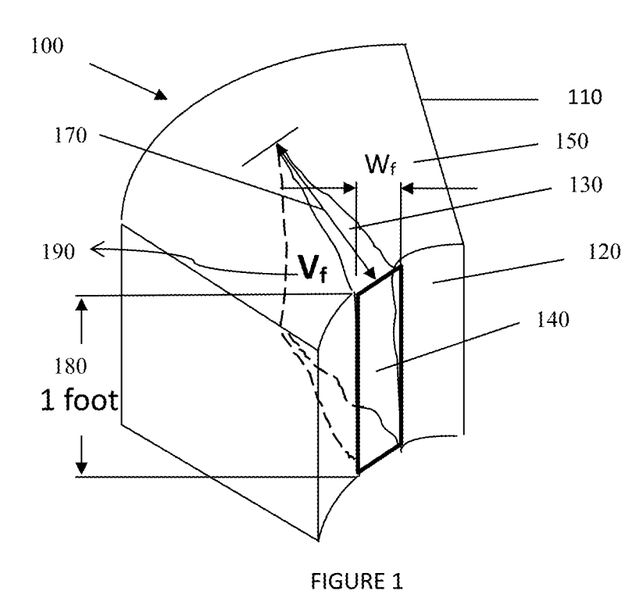
FIG. 1 depicts a three dimension illustration of a 1 foot section of a part of a geological formation and wellbore, within which there is a section of a hydraulic fracture with its entrance as 1 foot long at the wellbore wall, according to an embodiment.

FIG. 1 depicts a three dimension illustration 100 of a unit (1 foot) section of a hydraulic fracture 130 within a geological formation 110 and partial wellbore 120, according to an embodiment. As shown in FIG. 1, hydraulic fracture 130 may have an entrance 140 that is exposed within the wellbore 120. The entrance 140 of the hydraulic fracture 130 may have a width 150 as $W_f$ and a unit section height 180 as 1 foot. The fracture 130 may have a length 170 extending away from the wellbore 120 into formation 110. The width 150 and length 170 of hydraulic fracture 130 may be utilized to determine the unit fracture volume $V_f$ 190 of the hydraulic fracture, or the unit hydraulic fracture volume, which typically defines the desired spurt loss volume to be controlled. Methods for determining the volume of a unit section of the hydraulic fracture 130 are known, such as by U.S. Pat. No. 9,109,992, which is hereby incorporated by reference in its entirety.

In embodiments, responsive to a hydraulic fracture 130 being created, the width 150 and length 170 of the hydraulic fracture 130 may continue to grow unless hydraulic fracture 130 is sealed. Adding sealing particulates into drilling fluid at a high enough concentration may turn the drilling fluid into a sealing fluid that is utilized to seal hydraulic fracture 130, stopping hydraulic fracture 130 from increasing in size. Embodiments described herein determine a minimum concentration of the sealing particulates within a drilling fluid required to seal a hydraulic fracture 130 to prevent losing drilling fluid when drilling a weak wellbore.

Figure 2:
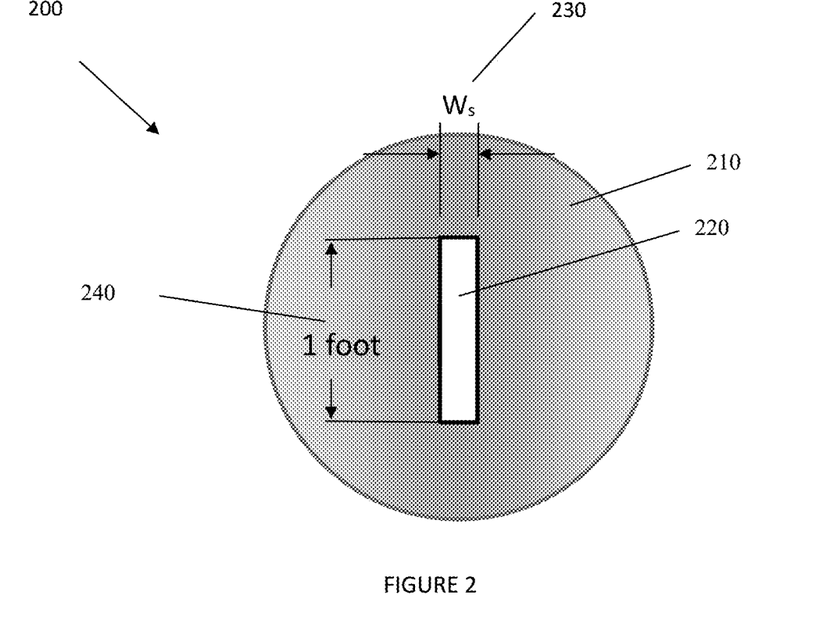
FIG. 2 depicts a slot disk with a slot opening simulating an entrance of a fracture at a wellbore wall, according to an embodiment.

FIG. 2 depicts a slot disk 200, according to an embodiment. Slot disk 200 may be utilized to create a slot disk test to determine a unit spurt loss of a fracture sealing fluid. In embodiments, slot disk 200 may have a surface 210 with a slot 220, wherein slot 220 may have a width 230 as $W_s$ and length 240. The disk may have various thickness but typically it is of 0.25 inches. In embodiments, the length 240 may be 1 foot or of other lengths. The slot 220 within slot disk 200 may be configured to simulate a section of an entrance 140 of a hydraulic fracture within a wellbore. In embodiments, slot disk 200 may include a plurality of slots 220, which may each have different lengths. The unit spurt loss may be obtained from a spurt loss volume from a slot disk test converted to one over a unit length of the total slot length. The unit length is typically 1 foot long.

In embodiments, drilling fluid refers to any fluid that can suspend the sealing particulates for a slot disk test.

Systems and methods for determining a spurt loss of a fracture sealing fluid utilizing a slot disk 200 are well known. It may be typically called a slot disk test.

Figure 3:
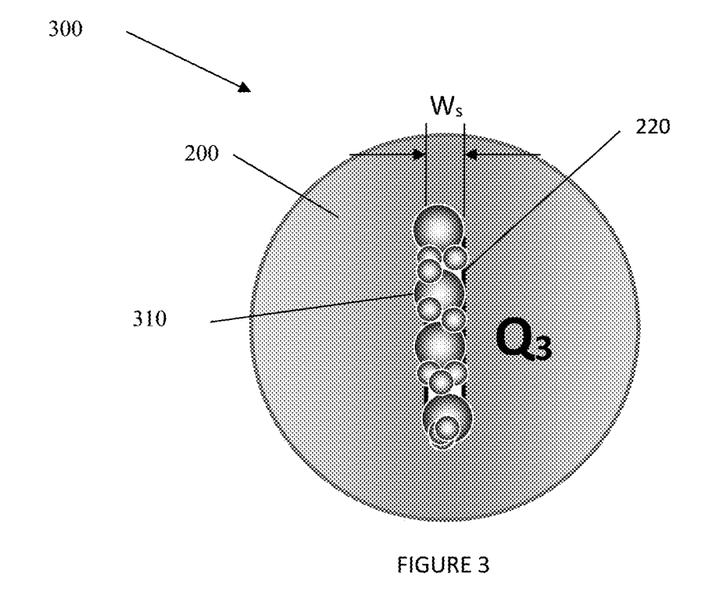
FIG. 3 depicts a seal of particulate fracture sealing composition sealing a slot within a slot disk, according to an embodiment.

FIG. 3 depicts a seal 310 formed by particles from a particulate fracture sealing composition on a slot 220 within a slot disk 200 during a slot disk test, according to an embodiment. The slot 220 has a width as $W_s$. In embodiments, seal weight $Q_3$, a weight of the seal 310 or the weight of the sealing composition in a sealing fluid required just to seal a slot 220 may be determined by collecting all the sealing particles of the seal and weighing the collected sealing particles on a scale. When the particle concentration in the sealing fluid is known, $Q_3$ can also be calculated based on the spurt loss volume of the slot disk test. Typically, sealing particles are evenly dispersed in a sealing fluid. Since the particles of the seal are brought to the slot location by the spurt fluid flowing through the slot, the seal weight $Q_3$ is equal to the product of the concentration of the sealing composition in the sealing fluid and the spurt volume. The sealing fluid typically is comprised of the particulate fracture sealing composition and drilling fluid.

Figure 4:
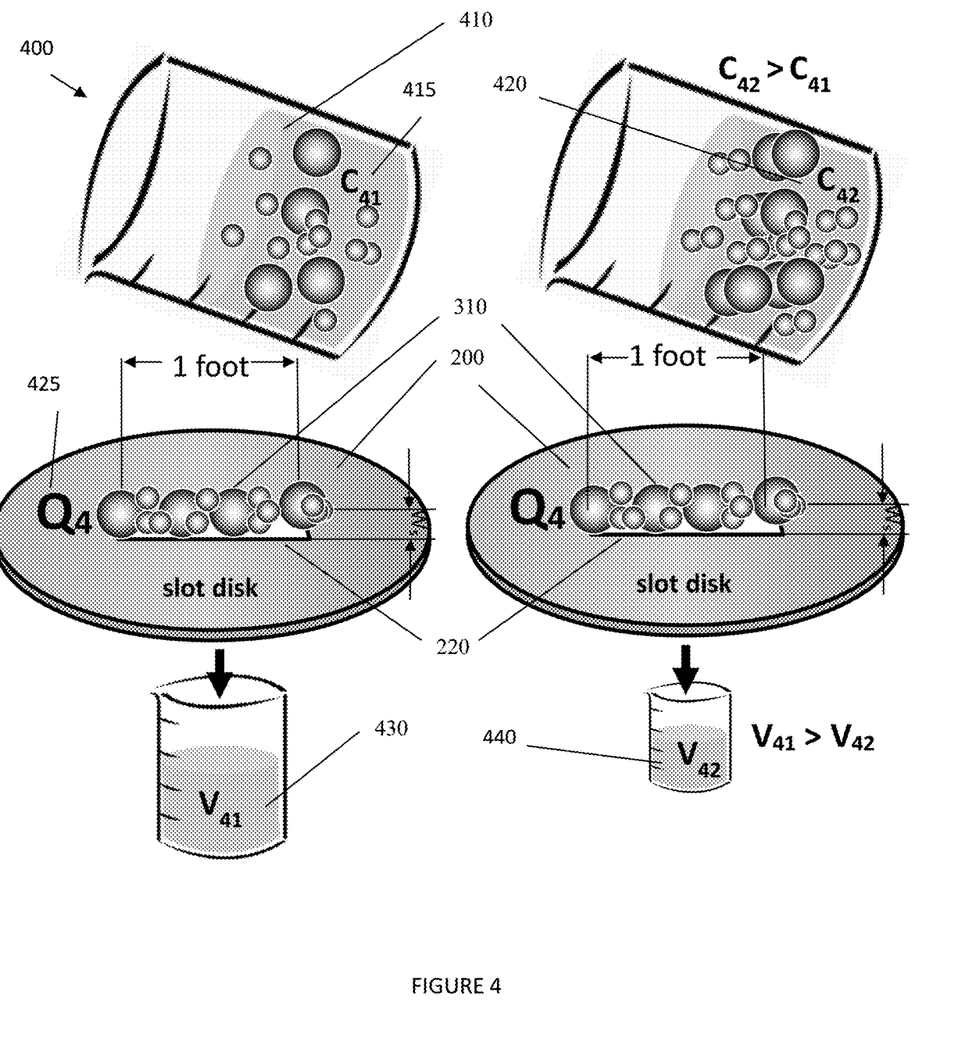
FIG. 4 depicts a way of determining a seal weight based on the concentration of sealing particulates within a drilling fluid and the unit spurt loss volume of a slot disk test, according to an embodiment.

FIG. 4 depicts an embodiment 400 of determining a seal weight $Q_4$ based on the concentration 415 ($C_{41}$) or 420 ($C_{42}$) of sealing particulates within a drilling fluid 410. This concentration 415 or 420 may be expressed as a ratio of the weight of the sealing particles in drilling fluid to the volume of the drilling fluid. As depicted in FIG. 4, concentration 415 ($C_{41}$) may be lower than concentration 420 ($C_{42}$). However, the same number of sealing particulates with the same weight 425 ($Q_4$) of seal 310 may be required to seal slot 220 within disk 200 though the two sealing fluids have two different concentrations of the sealing particulates. This may lead to the seal weight 425 of sealing slot 220 to be constant when using the same sealing composition of different concentrations 415, 420. This seal weight has little to do with the concentration of the sealing composition in a sealing fluid. This seal weight also has little to do with a typical drilling fluid for the sealing composition to be used in. Therefore, a seal weight can be viewed as a unique property of a sealing composition. Then it would be convenient to use a seal weight to quantify the sealing capacity of a sealing composition and furthermore compare different sealing compositions as long as the different sealing compositions are tested on the same slot width. This seal weight $Q_4$ then indicates the sealing efficiency of a sealing composition. The lower a seal weight, the more efficient a sealing composition.

Considering that all sealing particulates of seal 310 on a slot 220 were carried to the slot 220 by the spurt loss fluid that has flowed through the slot 220 during a slot disk test, the seal weight 425 ($Q_4$) of the sealing particulates on the slot 220 can be calculated by spurt loss volume 430 ($V_{41}$) or 440 ($V_{42}$) multiplied by the concentration 415 ($C_{41}$) or 420 ($C_{42}$) of the sealing particulates in the drilling fluid. In other words, $C_{41}V_{41}=C_{42}V_{42}=Q_4$. For instance, when concentration $C_{41}$ is only half of concentration $C_{42}$, the spurt loss volume $V_{41}$ would be double $V_{42}$. Therefore, when utilizing the same sealing composition, a higher concentration 420 of sealing particulates may result in a lower spurt loss 440 than a spurt loss 430 associated with a lower concentration 415 of sealing particulates.

Figure 5:
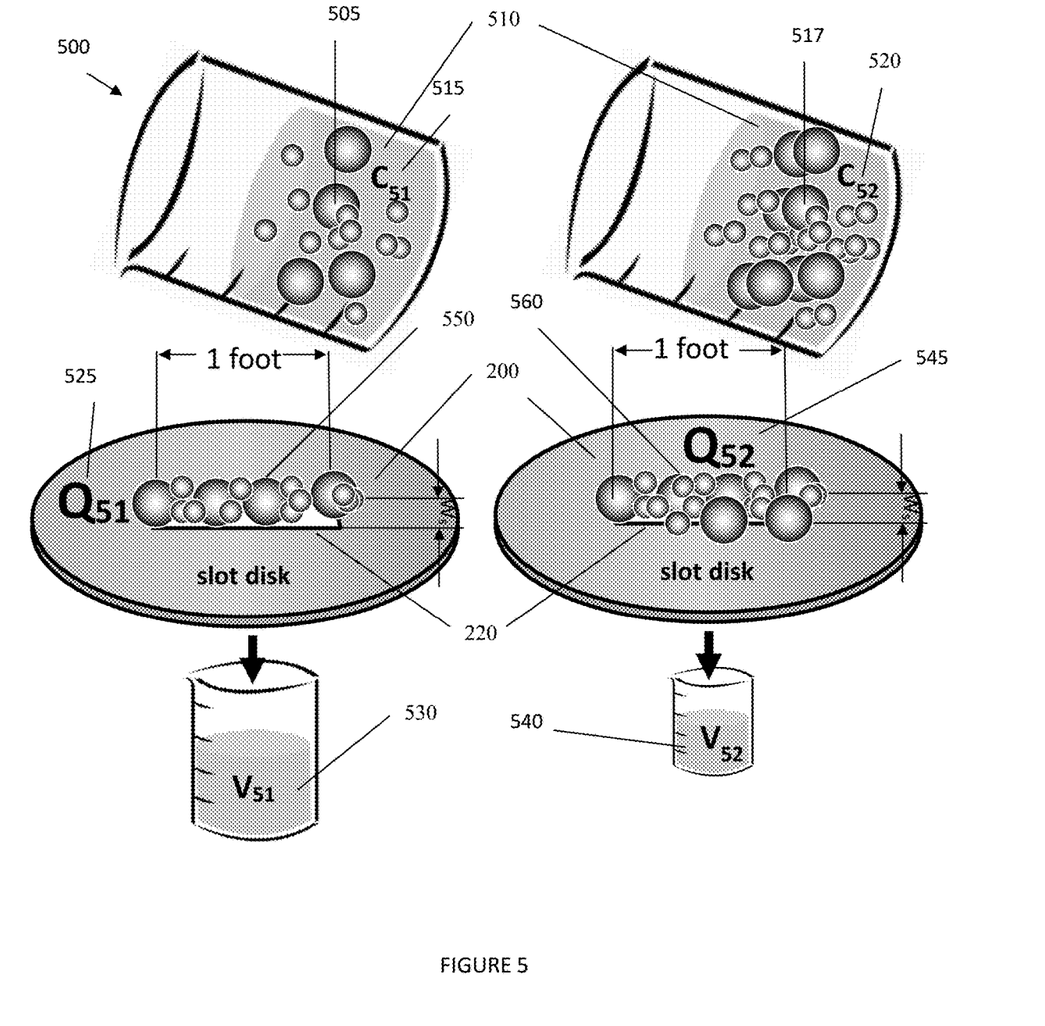
FIG. 5 depicts an embodiment of comparing two different sealing compositions, even when they are tested at two different concentrations, according to an embodiment.

FIG. 5 depicts an embodiment 500 of comparing two different sealing compositions even when they are tested at two different concentrations. In FIG. 5, sealing composition 505 is dispersed in drilling fluid 510 at concentration 515 ($C_{51}$) and sealing composition 517 is dispersed in drilling fluid 510 at concentration 520 ($C_{52}$). With spurt loss tests on a slot disk with a slot width as $W_s$ and a slot length of 1 foot, the sealing fluid of the sealing composition 505 generates a spurt volume 530 ($V_{51}$) and the sealing fluid of the sealing composition 517 generates a spurt volume 540 ($V_{52}$). The seal weight 525 ($Q_{51}$) for sealing composition 505 is calculated as $Q_{51}=C_{51}V_{51}$. The seal weight 545 ($Q_{52}$) for sealing composition 517 is calculated as $Q_{52}=C_{52}V_{52}$. When $Q_{51}$ is smaller than $Q_{52}$, sealing composition 505 can be characterized as being more efficient than sealing composition 517, or vice versa. Quantitively, if $Q_{51}$ is only one fifth of $Q_{52}$, the sealing composition 505 is five times more efficient than the sealing composition 517. In other words, for the same spurt loss volume to be controlled, if the concentration 515 must be ten pounds per barrel of drilling fluid using sealing composition 505, the concentration 520 must be five times or fifty pounds per barrel of drilling fluid using sealing composition 517.

For a given concentration of a sealing composition in drilling fluid, with the spurt loss volume from a slot disk test, the seal weight of the seal can be obtained. Furthermore, conversely, when the seal weight is known for a sealing composition, if a desired spurt loss volume to be controlled is given, the necessary concentration of the sealing composition in drilling fluid can also be obtained. This desired spurt loss volume to be controlled typically is equal to the unit fracture volume defined by the weak wellbore conditions, as described in U.S. Pat. No. 9,109,992.

Figure 6:
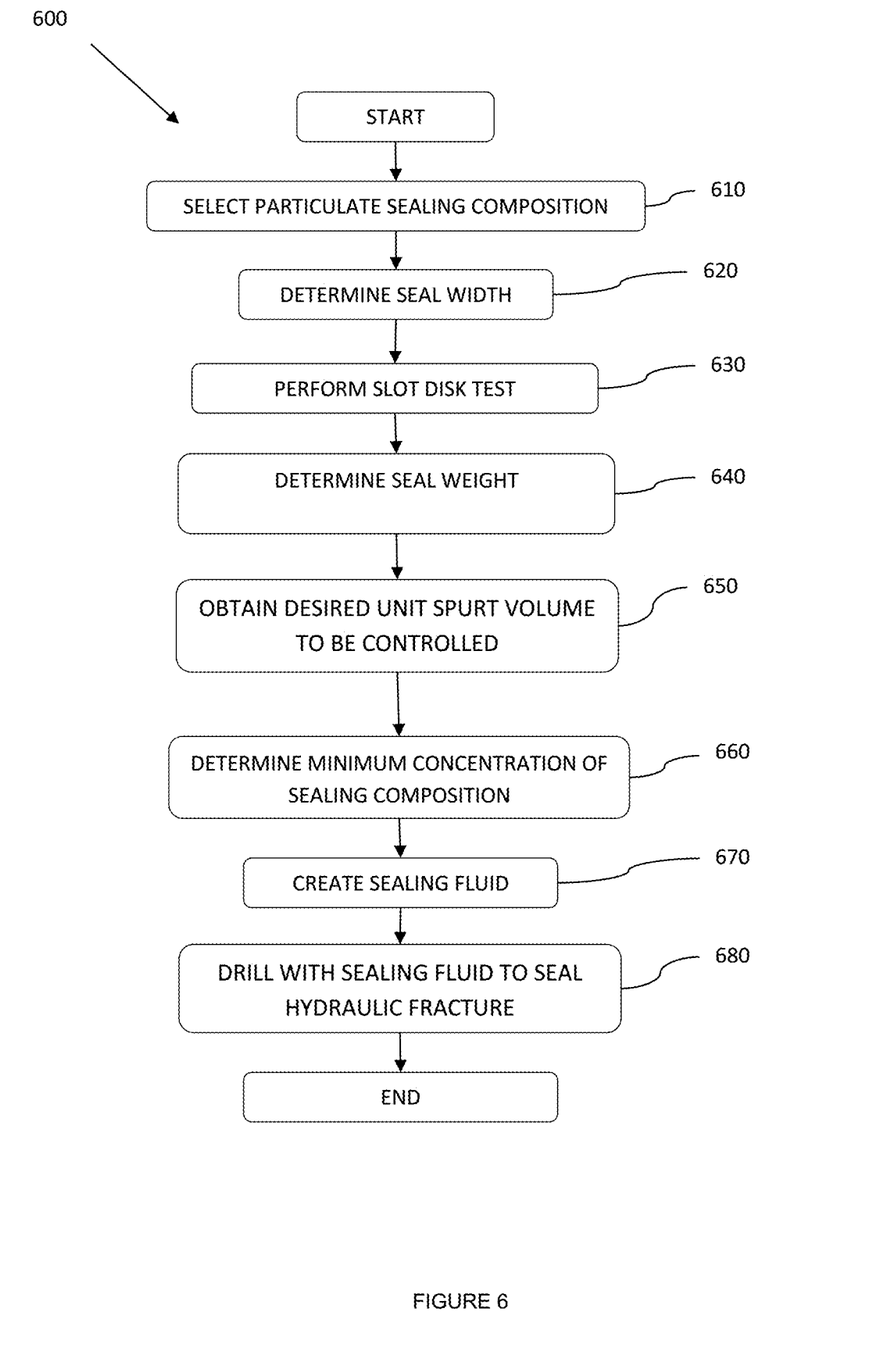
FIG. 6 depicts a method for determining the minimum concentration of a sealing composition of sealing particulates within drilling fluid to seal a hydraulic fracture for drilling a weak wellbore with the created sealing fluid, according to an embodiment.

FIG. 6 depicts a method 600 for determining the minimum concentration of sealing particulates within drilling fluid to seal a hydraulic fracture, according to an embodiment. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

At operation 610, a particulate sealing composition with multiple sealing particulates may be selected. In embodiments, different sealing compositions may comprise various sealing particulates with different sealing efficiencies. However, for the same sealing composition, sealing a certain length of a slot requires only a certain quantity of the same sealing composition, no matter what the concentration of the sealing composition in the sealing fluid is. Therefore, for the same sealing composition, a high concentration may generate a low spurt loss, and a lower concentration may generate a higher spurt loss. As such, the seal weight of sealing particulates of a known sealing composition required to seal the same slot will be constant whether there is a higher or lower concentration of sealing particulates within a sealing fluid.

At step 620, based on the particle size of the selected sealing composition, a seal width within the sealing capacity of the sealing composition is selected and a slot disk with a slot width equal to the selected seal width is also selected. The seal width is typically slightly smaller than the size of the largest particulates in the sealing composition. The selected seal width may be desirably close to the particle size of D90 of its particle distribution of the sealing composition. A person having ordinary skill in the art knows how to select a seal width.

At step 630, a spurt loss test may be performed with the selected slot disk. It is typical that, at a concentration, the sealing composition is evenly mixed into drilling fluid to form a sealing fluid in order to conduct the test. Then the sealing fluid is let go through the slot disk in a test cell by applying pressure. The fluid collected from the other side of the slot disk when a seal to the slot has just formed is the spurt loss. The spurt loss volume is then measured. This spurt loss volume may be further converted to a unit spurt loss by dividing it with the total slot length.

At step 640, a seal weight of the known sealing composition may be determined. In embodiments, if a sealing composition in a sealing fluid has a known concentration $C_6$ of sealing particulates in a sealing fluid, then a unit spurt loss $V_6$ may be determined by the slot disk test in step 630. Then the seal weight $Q_6$ of the sealing composition of the sealing particulates required to seal a unit length of the slot may be based on equation (1) below.

$$Q_6=C_6V_6 \quad (1)$$

Different sealing compositions may have different seal weights. Even with similar particle size distributions, two different sealing compositions may have different seal weights at least partially due to different sealing material properties of the sealing particles in the compositions. Though particulate sealing is very complex, this seal weight defined by a slot disk test offers a simple way to evaluate the sealing compacity. With the seal weight, different sealing composition can be directly compared without being tested at the same concentration. With the seal weight, for any desired spurt loss control, a minimum concentration required for the sealing composition can be directly calculated.

At step 650, for drilling a weak wellbore, the desired unit spurt loss $V_d$ to be controlled is obtained by experience or by the method detailed in U.S. Pat. No. 9,109,992.

At step 660, with the known seal weight $Q_6$, the minimum concentration $C_{min}$ of the sealing composition in drilling fluid to control the spurt loss not exceeding $V_d$ can be obtained by equation (2) below.

$$C_{min}=Q_6/V_d \quad (2)$$

At operation 670, a sealing fluid of sealing particulates and drilling fluid with a practical concentration of sealing particulates greater than $C_{min}$ may be created.

In operation 670, the drilling fluid for drilling the weak wellbore may be same or different from step 630, wherein a slot disk test is conducted to obtain the seal weight.

At operation 680, drilling with the sealing fluid, with the practical concentration of sealing particulates, into the wellbore may commence.

In applications for drilling, with the known seal weight $Q_6$, at a rig site, the concentration of a sealing composition in drilling fluid can be monitored daily by testing unit spurt loss volume of the sealing fluid. Then the concentration can be calculated and maintained daily. If the calculated concentration is smaller than the practical concentration, the difference between the calculated concentration and the practical concentration may indicate how much more of the sealing composition should be added to bring the spurt loss control back to the desired level.

For instance, in a first example, a hydraulic fracture and/or disk slot may have 1 foot as the unit length for either a fracture section height or a total slot length of a slot disk. A sealing composition may have a seal width of 850 microns based on the size of its largest particulates.

A single lab test with this composition of sealing particulates in drilling fluid at a concentration equals 20 pounds per barrel of drilling fluid on a slot disk with a slot width of 850 microns and a total slot length of 1 foot may result in a unit spurt loss of 46 milliliters. Utilizing these known variables, step 630, 640 and equation (1) above can be solved. This would results in equation (1) equaling 20 pound/barrel*46 milliliter/foot=20 (pound×453.6 gram/pound)/(barrel×158987 milliliter/barrel)×46 milliliter/foot=2.62 gram/foot. As such, utilizing equation (1) above the seal weight of the known sealing composition may be 2.62 grams per foot. Because the seal weight is known now for the sealing composition, the minimum concentration of the sealing composition required for any level of the spurt loss control for a sealing fluid with the sealing composition can be defined.

According to U.S. Pat. No. 9,109,992, a desired level of spurt loss control can be defined by the unit fracture volume when the fracture width is the same as the slot width or the seal width of the sealing composition selected. For a first weak wellbore, if the unit spurt loss volume is determined to be 40 milliliter/foot, the minimum concentration $C_{min}$ of the composition in drilling fluid can be determined utilizing equation (2) above. Utilizing equation (2) the minimum concentration of the sealing composition in drilling fluid may be realized as: 2.62 gram/foot/40 milliliter/foot=2.62 (gram/453.6 gram×pound)/foot/40 (milliliter/158987 milliliter×barrel)/foot=23.0 pounds/barrel. In drilling the weak wellbore, 25.0 pounds/barrel may be the practical concentration.

For a second weak wellbore, if the unit spurt loss volume is determined to be 60 milliliter/foot, the minimum concentration $C_{min}$ of the same sealing composition in drilling fluid can be determined utilizing equation (2) above. Utilizing equation (2) the minimum concentration of the sealing composition in drilling fluid may be realized as: 2.62 gram/foot/60 milliliter/foot=2.62 (gram/453.6 gram×pound)/foot/60 (milliliter/158987 milliliter×barrel)/foot=15.3 pounds/barrel. In drilling the weak wellbore, 17.0 pounds/barrel may be the practical concentration. Since the desired spurt loss control is looser, the required concentration of the same sealing composition is smaller, comparing with the first weak wellbore case.

After the minimum concentration is determined based on the desired unit spurt loss volume for a given fracture for a known sealing composition, the sealing composition may be added to drilling fluid at a practical concentration equal to or above the determined minimum concentration value. Then, an operator may drill the weak wellbore with the drilling fluid. Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method to compare different sealing compositions by a seal weight of the sealing compositions required to seal a hydraulic fracture, the method comprising:
   mixing first sealing particulates of a first sealing composition with a first drilling fluid at a first concentration to form a first sealing fluid;
   performing a first spurt loss test by flowing the first sealing fluid through a first slot of a first slot width within a first disk;
   determining a first seal weight of the first sealing composition required to seal the first slot of a unit slot length within the first disk;
   mixing second sealing particulates of a second sealing composition with a second drilling fluid at a second concentration to form a second sealing fluid;
   performing a second spurt loss test by flowing the second sealing fluid through a second slot of the first slot width within a second disk;
   determining a second seal weight of the second sealing composition required to seal the second slot of the unit slot length within the second disk;
   comparing the first seal weight and the second seal weight;
   determining that the first sealing composition is more efficient than the second sealing composition based on the first seal weight being less than the second seal weight.

2. The method of claim 1, further comprising:
   utilizing the first sealing composition within a drilling fluid based on the first seal weight being less than the second seal weight.

* * * * *